United States Patent [19]
Holmes

[11] 4,181,462
[45] Jan. 1, 1980

[54] SPREADER ASSEMBLY FOR STRADDLE CARRIERS

[75] Inventor: William K. Holmes, Schofield, Wis.
[73] Assignee: J. I. Case Company, Racine, Wis.

[21] Appl. No.: 899,517
[22] Filed: Apr. 24, 1978
[51] Int. Cl.[2] ............ B60P 3/00
[52] U.S. Cl. ............ 414/460; 212/13
[58] Field of Search ............ 414/459, 460, 461; 212/10-27; 180/24.02

[56] References Cited

U.S. PATENT DOCUMENTS

| | | | |
|---|---|---|---|
| 3,558,172 | 1/1971 | Lamer | 212/14 X |
| 3,655,081 | 4/1972 | Monk | 214/394 |
| 3,804,189 | 4/1974 | Smith | 180/24.02 |
| 4,119,229 | 10/1978 | Holmes | 414/460 |

*Primary Examiner*—Stephen G. Kunin
*Assistant Examiner*—Terrance L. Siemens
*Attorney, Agent, or Firm*—Dressler, Goldsmith, Clement, Gordon & Shore, Ltd.

[57] ABSTRACT

A spreader assembly adapted to be attached to containers for raising and lowering the containers in the bay of a straddle carrier is provided herein. The spreader assembly includes a pair of spaced generally parallel beams that extend through openings in a spreader with the spreader being shiftable on the beams. A cable assembly is interposed between the respective beams and a center part of the spreader to limit the longitudinal movement of the spreader with respect to the beams while accommodating transverse movement of the spreader on the beams.

12 Claims, 4 Drawing Figures

SPREADER ASSEMBLY FOR STRADDLE CARRIERS

BACKGROUND OF THE INVENTION

The present invention relates generally to straddle carriers for containers of the type disclosed in Holmes et al. U.S. Ser. No. 844,655, filed Oct. 25, 1977, now U.S. Pat. No. 4,119,229, which is incorporated herein by reference. The straddle carrier disclosed therein consists of a generally inverted U-shaded frame having two transversely spaced vertical legs interconnected at their upper ends by a horizontal frame portion with the vertical legs respectively supported by a plurality of wheels. A spreader assembly is supported in the bay defined between the pair of legs and is raised and lowered through hoisting fluid rams.

The spreader assembly that is disclosed in the above mentioned application consists of a pair of beams that are respectively guided at opposite ends on the vertical legs of the frame and extend through openings located at opposite ends of the spreader with cushioning members interposed between opposite ends of the spreader and the beams. The spreader is capable of being shifted transversely on the respective beams through a pair of side-shift fluid rams that are interposed between opposite ends of the spreader and the respective beams.

While the straddle carrier that is disclosed in the above-mentioned application has received remarkable acceptance in the intended environment, some problems have been encountered in the spreader assembly. It has been found that the large loads that are supported by the spreader while the vehicle is being moved from one location to another causes an undue amount of longitudinal movement of the spreader with respect to the beams. This has been found to produce an unusual amount of wear on the cushioning assemblies that are located between the spreader and the respective beams. In fact, it has been found that the cushioning members deteriorate rather rapidly and must be replaced periodically.

SUMMARY OF THE INVENTION

According to the present invention, a spreader assembly of the type disclosed in the above-mentioned application, which is incorporated herein by reference, incorporates a mechanism for limiting the longitudinal movement of a spreader with respect to a pair of supporting beams that cooperate with opposite ends thereof, while still accommodating transverse shifting of opposite ends of the spreader with respect to the respective beams.

In the illustrated embodiment, the spreader assembly consists of a pair of spaced generally parallel horizontal beams that are guided on the frame of an inverted U-shaped straddle carrier and extend through openings that are defined in opposite ends of a spreader. Fluid rams are interposed between the respective beams and the respective ends of the spreader and can be individually actuated to shift the spreader with respect to the respective beams.

According to the present invention, a cable assembly is interposed between the respective beams and an intermediate portion of the spreader to limit longitudinal movement of the spreader with respect to the transversely extending beams. In the specific embodiment illustrated, the cable assembly consists of first and second cables that are of equal length and respectively have opposite ends connected to adjacent respective ends of the respective beams. Guide means are located on an intermediate portion of the spreader and the respective cables are entrained over the guide means.

The specific guide means illustrated consists of first and second pairs of pulleys that are located adjacent opposite sides of the spreader along a plane that extends generally parallel to the beams through the center of the spreader. The vertically spaced pulleys of each pair are rotatable on a fixed vertical axis on the spreader and the first and second pulleys of each pair are generally horizontally aligned with each other and are located between the upper and lower surfaces of the spreader in general alignment with the horizontally extending beams. The first cable is entrained over the first pulleys of each pair while the second cable is entrained over the second pulleys of each pair so that the cables are free to move along the peripheral surfaces of the pulleys while the spreader is being transversely shifted on the respective beams. However, the longitudinal movement of the spreader with respect to the beams is virtually prevented.

BRIEF DESCRIPTION OF THE SEVERAL VIEWS OF THE DRAWINGS

FIG. 4 is an enlarged fragmentary sectional view, as viewed along line 4—4 of FIG. 2.

DETAILED DESCRIPTION

Figure 1:
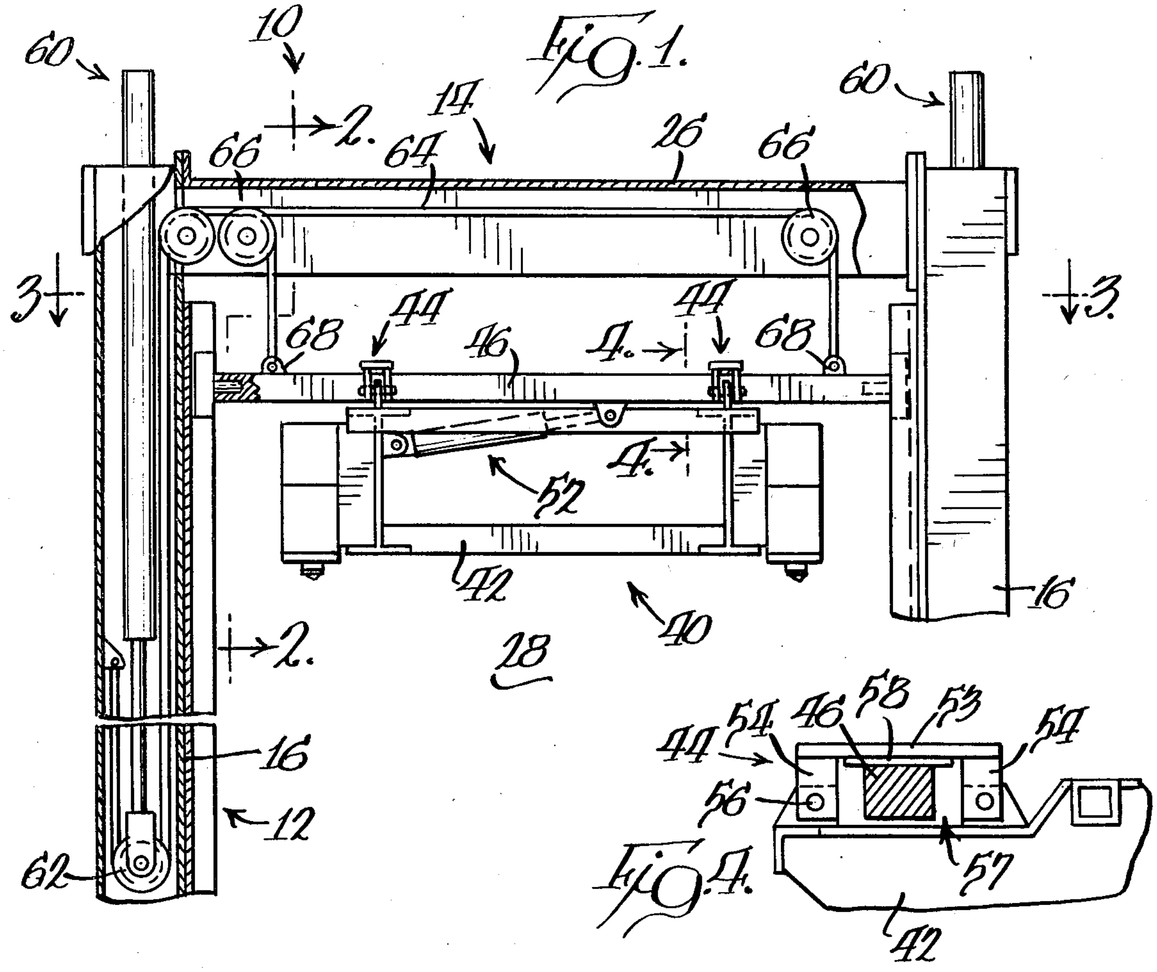
FIG. 1 is an end view of a portion of a straddle carrier, with parts thereof being broken away for purpose of clarity.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a portion of the straddle carrier disclosed in U.S. Pat. No. 4,119,229 and is generally designated by reference numeral 10. Straddle carrier or vehicle 10 consists of a generally inverted U-shaped frame 12 having an upper horizontal portion 14 and a pair of spaced legs 16 depending from opposite edges of the upper horizontal portion with each leg supported at its lower end by a plurality of wheels (not shown).

Figure 3:
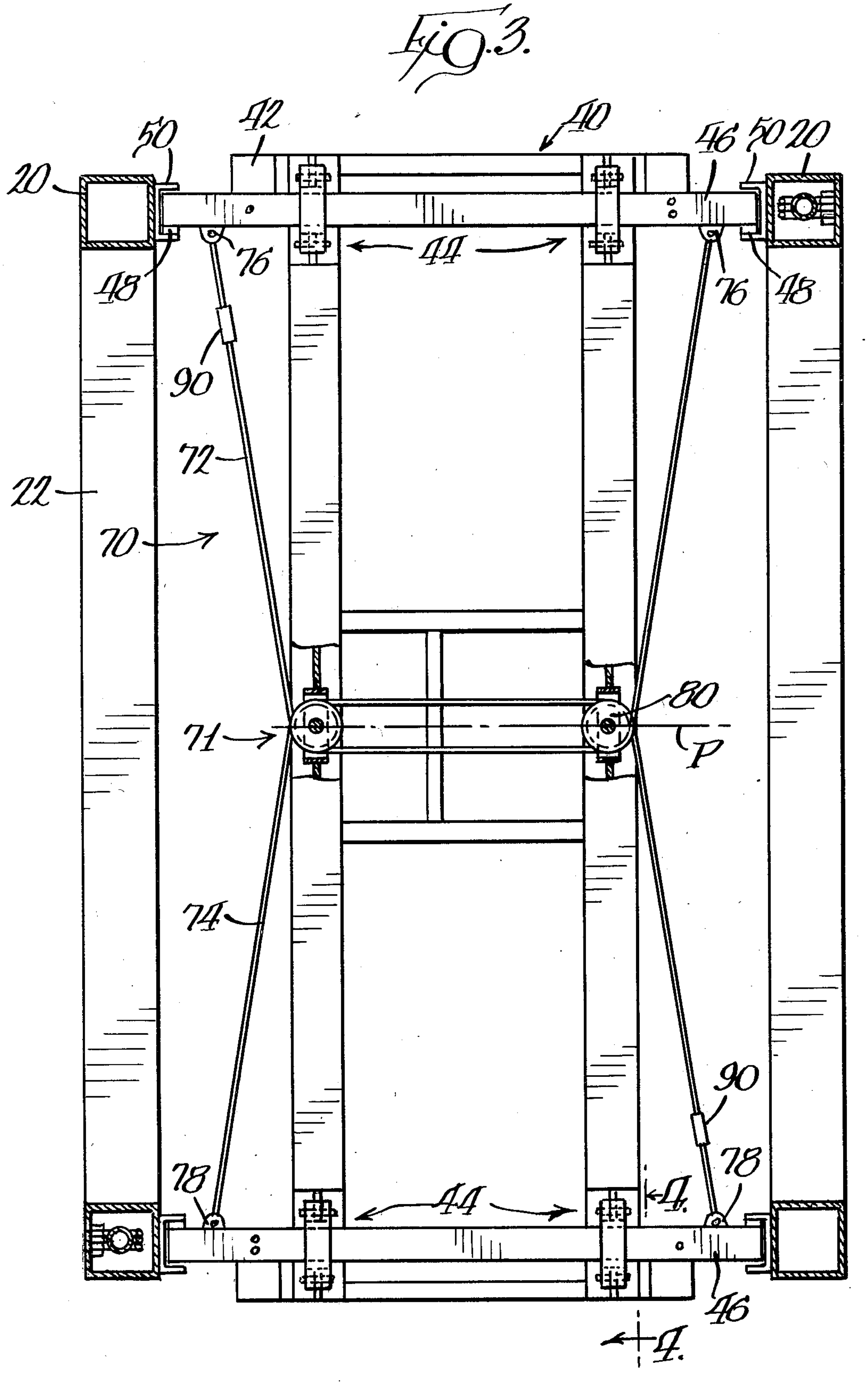
FIG. 3 is a sectional view as viewed along line 3—3 of FIG. 1.

Frame structure 12 consists of two longitudinally spaced, vertically extending hollow columns 20 (FIG. 3) that are interconnected at their lower ends by elongated hollow columns 22 and their upper ends by elongated hollow columns 24. The upper ends of the respective hollow vertical columns 20 are interconnected by transverse horizontal hollow columns 26 to define a generally inverted U-shaped frame that defines an elongated open cargo or container receiving bay 28.

Straddle carrier 10 incorporates a spreader assembly, generally designated by reference numeral 40 which is supported for vertical movement with an open bay 28 through a hoisting mechanism that will be described later. Spreader assembly 40 includes a spreader or generally open frame structure 42 which is supported on transversely extending beams 46 at each end thereof. More specifically, spreader 42 is suspended from beams 46 by support means 44.

The outer free ends of the respective horizontal beams 46 which extend generally parallel to each other, have Nylatron blocks 48 secured to the free ends thereof. Blocks 48 are received in open guide members 50 that are secured to the respective vertical columns 20. Spreader 40 can be shifted transversely on beams 46 by first and second side-shift fluid rams 52 (only one being shown) and are respectively interposed between the respective beam 46 and opposite ends of spreader 42.

The respective support means 44 are identical in construction and are illustrated in FIG. 4. Each support means 44 includes a plate 53 that has legs 54 depending therefrom which are connected to the frame of spreader 42 through bolts 56 to define an opening 57. Beam 46 extends through opening 57 and a Nylatron block 58 is preferably secured to the lower surface of plate 53 and acts as a bearing surface for the adjacent surface of beam 46. Openings 57 are of sufficient size to accommodate some tilting of the spreader with respect to the beams.

Spreader assembly 40 is adapted to be raised and lowered through hoisting fluid ram means consisting of first and second hoisting fluid ram assemblies 60 that are respectively located in diagonal vertical columns 20. Each fluid ram assembly 60 includes pulleys 62 connected to the free end of the piston rod with flexible chains 64 secured at one end inside column 20 and entrained over pulleys 62 and additional pulleys 66 with opposite ends of flexible chains secured to beams 46 by connections 68, as illustrated in FIG. 1. The apparatus so far described is substantially identical to the apparatus disclosed and described in the above-mentioned application.

According to the present invention, spreader assembly 40 incorporates means for limiting longitudinal movement of spreader 42 with respect to beams 46 while accommodating transverse shifting of opposite ends of the spreader on the beams. The means for limiting longitudinal movement consists of cable beam 70 connected to respective beams 46 and entrained over guide means 71 located on an intermediate portion of spreader 42. Cabled means 70 consists of first and second cables 72, 74 which are preferably substantially equal in length. Cable 72 has opposite ends connected adjacent respective ends of first beam 46 through suitable connections 76 while cable 74 has opposite ends connected adjacent respective ends of the second beam 46 through suitable connections 78. The intermediate portions of both cables 72 and 74 are entrained over guide means 71.

Figure 2:
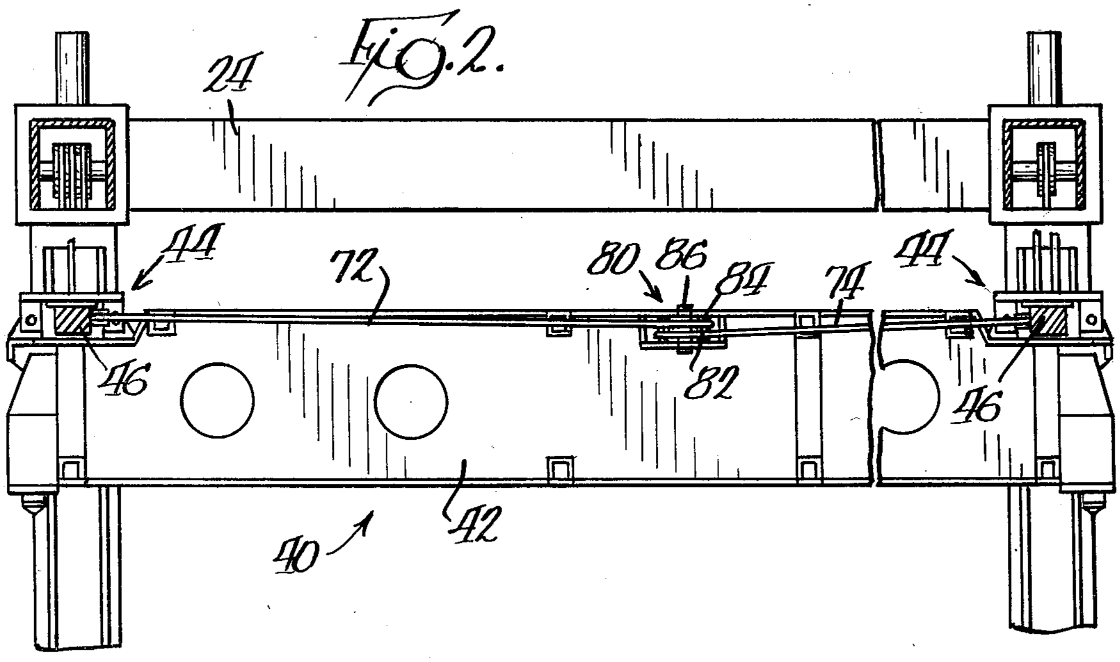
FIG. 2 is a sectional view as viewed generally along line 2—2 of FIG. 1.

Guide means 71 consist of first and second pairs of spaced pulley assemblies 80 which are respectively located along a plane P that extends through the center of spreader 42 and is generally parallel to both beams 46. Each pair of pulley assemblies 80 consist of first and second vertically spaced pulleys 82 and 84 that are freely rotatable on a pin 86 which defines a fixed pivot axis for the pair of pulleys. As illustrated in FIG. 2, the vertically spaced pulleys 82 and 84 are located in substantial alignment with beams 46 and are positioned between the upper and lower surfaces of spreader 42. The first cable 72 is entrained over both upper pulleys 84 while the second cable 74 is entrained over both lower pulleys 82.

Thus, the cable means 70 and cooperating guide means 71 will allow each end of spreader 42 to be shifted transversely on the beams and the cables will move along the surfaces of the freely rotatable pulleys 82 and 84. However, longitudinal movement of spreader 42 within open bay 28 relative to beams 46 is prevented.

It has been found that the arrangement disclosed and described above will substantially increase the life of a spreader assembly and reduces the maintenance cost of a spreader assembly.

As indicated above, cable means 72 and 74 are preferably of equal fixed length. However, adjustable means 90 are incorporated into each cable to vary the effective length thereof. Adjustable means 90 may be in the form of a conventional turn-buckle which can be utilized for accurately positioning spreader 42 and beams 46 with respect to each other during initial assembly of the spreader assembly.

It will also be appreciated that while two transversely spaced guide means 80 are illustrated as being located on opposite sides of the spreader along the center plane P, in some instances only a single set of guide means or pulleys would be adequate and could be located at the center of the spreader.

What is claimed is:

1. In a straddle carrier for transporting containers and including an inverted U-shaped frame defining a container receiving bay, first and second spaced generally parallel horizontal beams guided on said frame for vertical movement in said bay, hoisting means on said frame for raising and lowering said beams and said spreader in said bay, and side shift means between said beams and said spreader, the improvement of first cable means between said first beam and an intermediate portion of said spreader and second cable means between said second beam and an intermediate portion of said spreader, said first and second cable means limiting longitudinal movement of said spreader with respect to said beams while accommodating transverse movement within said bay.

2. A straddle carrier as defined in claim 1, in which said first cable means includes a fixed length cable having opposite ends respectively connected adjacent respective ends of said first beam and in which said second cable means includes a fixed length cable having opposite ends respectively connected adjacent opposite ends of said second beam.

3. A straddle carrier as defined in claim 2, further including guide means on an intermediate portion of said spreader with both cables entrained over said guide means.

4. A straddle carrier as defined in claim 3, in which said cables are of substantially equal length with said guide means located along a plane extending generally parallel to said beams and through the center of said spreader.

5. A straddle carrier as defined in claim 3, in which said guide means includes a pair of pulleys supported for rotation on a fixed axis with respective cables entrained over respective pulleys.

6. A straddle carrier as defined in claim 5, in which said fixed axis is located along a plane extending parallel to said beams and through the center of said spreader.

7. A straddle carrier as defined in claim 6, in which said fixed axis is located adjacent one side of said spreader and in which said guide means includes a second pair of pulleys supported for rotation on a second fixed axis located along said plane adjacent an opposite side of said spreader.

8. A spreader assembly for raising and lowering containers in a bay of a straddle carrier, comprising an elongated spreader adapted to be attached to a container and having transversely extending opening means adjacent opposite ends thereof, first and second beams respectively extending through the respective opening means, shifting means between respective beams and opposite ends of said spreader, cable means connected to the respective beams and guide means on an intermediate portion of said spreader with said cable means entrained over said guide means and limiting longitudinal movement of said spreader with respect to said beams while accommodating shifting of said spreader on said beams.

9. A spreader assembly as defined in claim 8, in which said guide means includes first and second pairs of vertically spaced pulleys respectively supported for rotation about spaced axes on said spreader.

10. A spreader assembly as defined in claim 9, in which said first and second pairs of pulleys are respectively located along a plane extending generally parallel to said beams and through the center of spreader.

11. A spreader assembly as defined in claim 10, in which said cable means includes first and second cables of approximately equal length respectively having opposite ends connected adjacent opposite ends of respective beams, each cable having an intermediate portion entrained over a pulley of each pair.

12. A spreader assembly as defined in claim 11, further including adjustable means in each cable for varying the effective length thereof.

* * * * *